United States Patent

Troll et al.

[15] 3,659,950

[45] May 2, 1972

[54] LASER APPARATUS FOR DETECTING THE SIZE AND FORM OF FILAMENTARY MATERIAL BY MEASURING DIFFRACTED LIGHT

[72] Inventors: John Troll, Ridgefield; Cole Baker, Stratford, both of Conn.

[73] Assignee: Iris Corporation

[22] Filed: July 14, 1969

[21] Appl. No.: 841,213

[52] U.S. Cl. ............................ 356/199, 250/219, 356/200, 356/238
[51] Int. Cl. ............... G01n 21/18, G01n 21/30, G01n 21/16
[58] Field of Search ................... 356/199, 200, 237–239, 356/242; 250/219 S

[56] References Cited

UNITED STATES PATENTS

| 3,193,689 | 7/1965 | Kerr | 250/219 S UX |
| 3,202,043 | 8/1965 | Galey et al. | 356/200 X |
| 3,283,162 | 11/1966 | Quittner | 356/200 X |
| 3,178,995 | 4/1965 | Hartman | 356/159 |
| 3,305,688 | 2/1967 | Lamparter | 250/219 S |

FOREIGN PATENTS OR APPLICATIONS

| 211,564 | 1960 | Austria | 356/238 |
| 375,936 | 4/1964 | Switzerland | 250/219 S |

Primary Examiner—Ronald L. Wibert
Assistant Examiner—Warren A. Sklar
Attorney—Sandoe, Hopgood and Calimafde

[57] ABSTRACT

A device for measuring moving filaments includes a laser whose beam is split and the split beams not blocked directed upon distinct filament portions; the light diffracting past the filaments falls upon respective optical sensors. The filament portions may be either longitudinally spaced along the same filament, angularly spaced about the same longitudinal filament position or include the moving filament and a standard. The outputs of the optical sensing means are compared and a signal is produced representative of such a comparison. An arrangement is also disclosed which employs selected energy levels within the diffraction pattern of an unsplit beam to precisely measure a moving filament.

5 Claims, 4 Drawing Figures

INVENTORS
JOHN TROLL
COLE BAKER

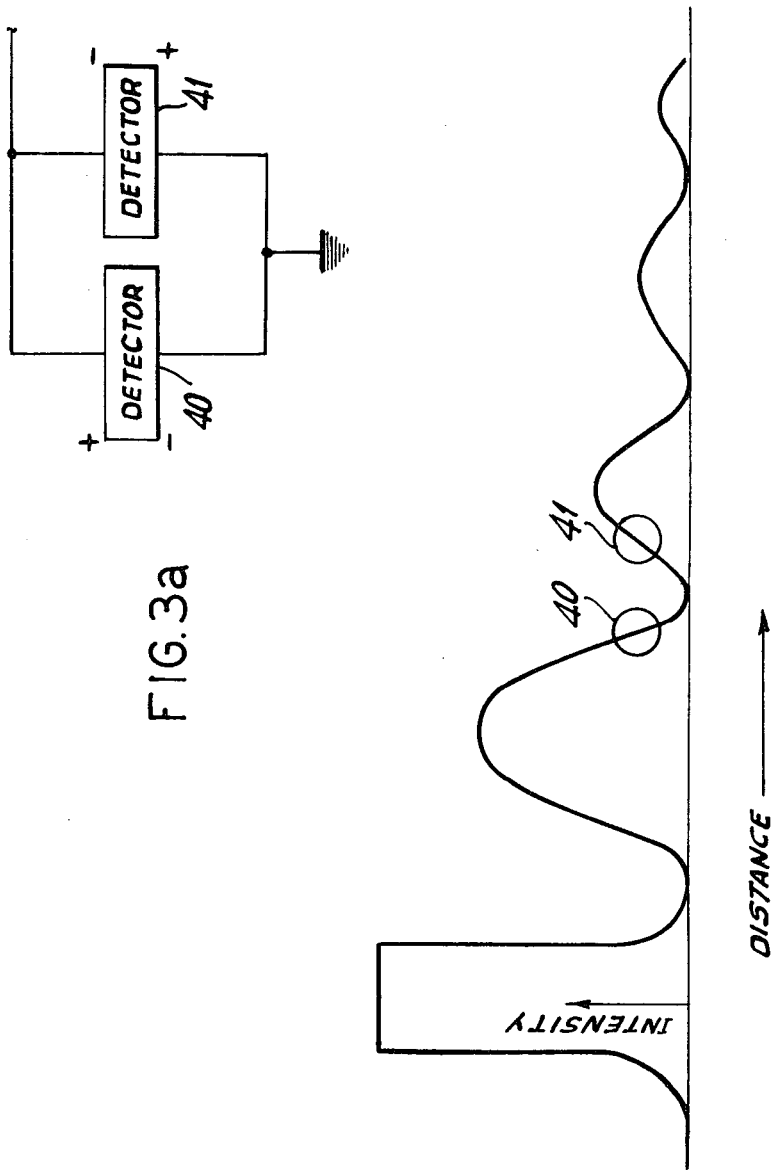

LASER APPARATUS FOR DETECTING THE SIZE AND FORM OF FILAMENTARY MATERIAL BY MEASURING DIFFRACTED LIGHT

BACKGROUND OF THE INVENTION

Conventional arrangements for precisely determining the dimensions and/or circularity of a moving filament such as wire include a variety of types.

Arrangements which require filament contact range from simple mechanical techniques where the wire is paced by a micrometer for a predetermined distance to more sophisticated eddy current and capacative systems. Such arrangements, however, where physical contact must take place between the moving wire and the measuring instrument are extremely cumbersome, require frequent inspection and maintenance, and often deform the wire itself.

Non-contacting arrangements on the other hand, such as the shadow-graph method that projects an enlarged image onto a photoelectric array tend to be complicated and position sensitive, and lateral filament movement effectively negatives a finite comparison or reading.

Accordingly, it is the object of this invention to provide a device for evaluating the profile of a moving filament, which is of the non-contacting type which is not vulnerable to lateral shifts in filament position.

It is a further object of this invention to provide a measurement system of the foregoing type which is simple and economical, both to manufacture and maintain, and which is extremely flexible in adapting to different filament sizes and shapes.

SUMMARY OF THE INVENTION

Briefly, the invention is predicated upon the employment of a laser emitting a collimated light beam which in one embodiment is split into two or more light beams directed at respective filament portions. Each beam is greater in cross section than the filament portion crossing its path and, after passing the associated filament portion, impinges upon an associated optical sensor which is positioned to intercept the diffraction pattern of the laser beam. A comparator is fed with the sensing means' signals and evaluates the desired program conditions.

In a second embodiment of the invention the diffraction pattern is itself analyzed, and nodes within a single diffraction pattern compared as to their spacing and/or intensity. By appropriately locating sensors a programmed response may be initiated.

The above mentioned and other features and objects of this invention and the manner of attaining them will become more apparent and the invention itself will best be understood by reference to the following description of embodiments of the invention taken in conjunction with the accompanying drawings, the description of which follows.

FIGS. 3 and 3a illustrate the relationship between photo-responsive detectors and the diffraction energy distribution in accordance with an embodiment of the invention.

DETAILED DESCRIPTION OF THE INVENTION

Figure 1:
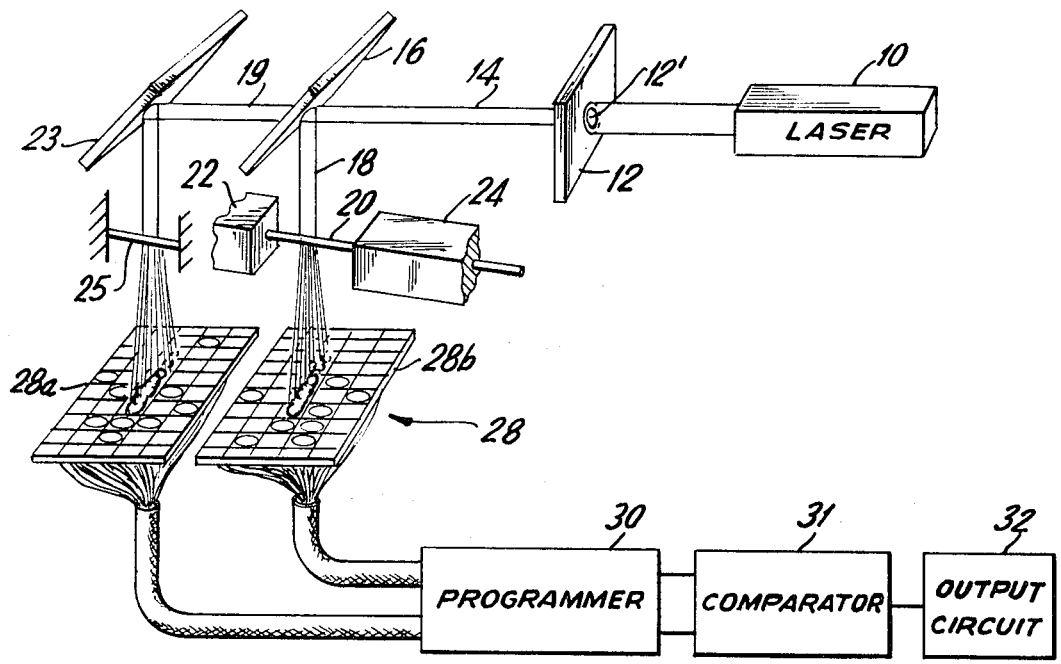
FIG. 1 illustrates one embodiment of the invention for effectuating the comparison of a moving filament with a standard.

The output of the laser 10 which may, for example, be of the helium-neon type is directed to a mask 12. In its simplest form, the mask may be constituted by an opaque plate having a centrally disposed aperture whose form and dimensions are dependent upon the filament being measured, and the desired diffraction pattern.

For purposes of illustration, the filament under consideration is chosen to be wire of circular cross section. In such a case, it has been found preferable to make the mask aperture 12' also circular and of a diameter approximately twice that of the filament. The naturally collimated light beam 14, which represents the unmasked output of the laser beam, is directed to beam splitter 16 which functions to divide light beam 14 intensity-wise into two beams 18 and 19. Beam splitter 16 may be simply constituted by a semi-transparent (half-silvered) mirror.

The reflected portion of the beam 18 is directed by virtue of the angular attitude of mirror 16 to intercept the moving filament 20 which is maintained in reasonably close lateral tolerance by means of guides 22 and 24. It will be appreciated by those skilled in the art that the dimensions shown are for purposes of illustration, and do not reflect actual linear dimensions or spacings. Suffice it to say, however, because of the collimated nature of the laser beam the spacing between the beam splitter and reflectors and the filament under consideration may vary considerably, and little loss is occasioned by separations of several feet.

The transmitted split beam 19 is directed to reflector 23 (for example, a micro-finished chrome plate) and by means of the angular position of this reflector fed across the filament standard 25 which is fixed in position.

After passing the standing and moving filaments, the respective beams will each project a diffraction pattern in accordance with the presented filament profile. Accordingly, there is provided an optical sensor 28 having portions 28a and 28b positioned to intercept the respective diffraction patterns. While the optical sensor may take many forms, we have chosen to illustrate it as a pair of photo-cell matrices, the individual cells of which are led to a programmer 30.

Programmer 30 may simply be constituted by a circuit which adds energy levels giving a purely quantitative or integrative response to be evaluated by comparator 31. Programmer 30 may also be a cross-connect network in which the desired order of the diffraction pattern is programmed through to comparator 31. Thus, for example, (and this is dependent upon the sophistication of the measurement), the comparison may be made only between the fundamental diffraction modes, and only those photo-cells which will be impinged upon by that mode would then be led to the comparator. On more complicated or higher tolerance comparisons, several orders of diffraction nodes and their respective separations may be run through the programmer and Boolean logic applied therein so that a single signal may be fed from each of the arrays 28a and 28b to the comparator 31.

Comparator 31, for example, is a serial differential amplifier and threshold device which, upon a deviation from standard exceeding a predetermined threshold, will trigger output circuit 32. Output circuit 32 may be employed as a control device to mark the moving filament where it has deviated beyond the permissible limit from the standard or it may merely trigger an annunciator which displays the difference. The use to which the comparator signal is put, i.e., the particular output circuit, depends upon manufacturing considerations too numerous to elaborate upon and, hence, since these systems are unnecessary to an understanding of the invention, they will not be described further.

Figure 2:
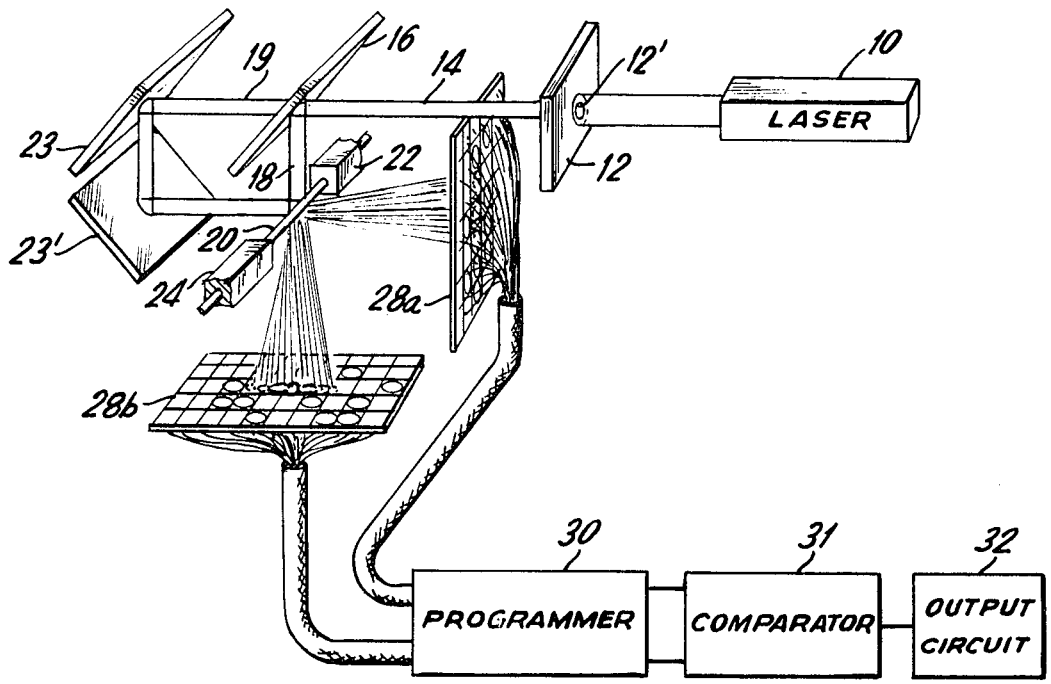
FIG. 2 illustrates a second embodiment of the invention for determining the circularity of the moving filament.

FIG. 2 shows an alternative arrangement where similar parts are designated similarly to FIG. 1. In the embodiment of FIG. 2 the beam is split twice and the two beams directed orthogonally to the wire 20. In this case a comparison of the diffraction patterns which impinge upon optical sensors 28a and 28b permit a reading of circularity. While as in the foregoing embodiment the beam has only been split twice, it is possible to split the beam any number of times directing each of the beams in a manner which will produce the desired function analysis. Thus, for example, when a circularity to extremely close tolerances is necessary, five beams could be directed upon the wire, each emanating from the same source and each impinging upon a respective optical sensor whose outputs run through a programmer to a comparator. Naturally, the programming requirements would become more complex with the greater number of diffraction patterns which would be analyzed. Where the programmer size becomes impractical due to its sophistication, the optical sensing means can take the form of a vidicon which scans the plate upon which the defraction pattern impinges. The comparator would then include a stored signal (for example on magnetic tape) representative of the vidicon signal of a standard refraction pattern. The comparison would then be effected serially.

It will be appreciated that since the laser beam has a high energy level per small cross section and is almost perfectly collimated, the beam can be split a great number of times and reflected with no appreciable loss of definition. The diffraction patterns in the coherent beam are not sensitive to the length of the optical path and will remain distinctive even when projected several feet. Further, it will be appreciated that the described system is extremely flexible, and the diffraction may be controlled the desired degree, dependent upon the shape of the masking aperture, its size, and the profile of the filament (which could be square, flat, round, etc.).

FIGS. 3 and 3a show a still further embodiment of this invention. In this embodiment the beam is unsplit and is positioned so as to impinge directly upon the wire 20. As before, the wire is perpendicular to the laser beam and is of smaller cross section than the laser beam diameter. The resultant phenomenon is equivalent to that produced by the interference pattern of diffracted light passing through an unobstructed slit equal to the wire diameter.

As in the classic case of diffraction of light by a slit, the light diffracted by the small diameter wire projects an image of the fundamental laser beam plus the nodes produced by the interference of two diffracted patterns from the wire edges. It will be appreciated that what is being observed now merely expands upon the result achieved in FIGS. 1 and 2. However, in these figures, the emphasis was upon quantitative rather than qualitative evaluation of the energy distribution.

FIG. 3 is a graph of the illumination energy or nodes produced on one side of center. The other side is a mirror image. In a typical case using a 0.08 inch diameter laser beam and a 0.001 inch wire, and a distance from the wire to projection screen of 50 inches, the node to node separation is approximately 1 inch. If a 0.0005 inch wire is used, the node separation becomes approximately 2 inches.

Superimposed on FIG. 3 is one embodiment of the node position detection system utilizing the characteristics peculiar to the energy distribution. A pair of photo-sensitive detectors 40 and 41 are disposed so as to be located respectively upon the forward slope of one curve and the rear slope of the adjacent curve. By employing this positioning, any variation in wire diameter will result in a movement of the curve left or right. If the detectors are arranged as shown in FIG. 3a, back-to-back, so that a null is effected, any change will be doubly apparent, i.e., the movement will have twice the influence on the null detecting instrument.

The foregoing arrangement has the advantage that all variations in ambient light, laser output, detector signal or amplifier gain, has little or no effect on the output signal since both detectors are equally affected.

The invention has been found to produce useful information of differences as small as 50 microns in wire sizes as small as 0.0003 inch.

While the principles of the invention have been described in connection with specific apparatus, it is to be clearly understood that this description is made only by way of example and not as a limitation to the scope of the invention as set forth herein. For example, while a laser source is preferred, any source of collimated mono-frequency electromagnetic energy which is of a length which is short (for example, 20 percent or less) with respect to the diameter size of the wire may be employed.

What is claimed is:

1. A measurement device for the profile of a moving filament comprising:
   means for emitting a collimated light beam;
   a beam splitter disposed to intercept said beam and provide at least two substantially equal collimated light beams;
   means for directing said beams respectively on at least two supported filament portions, each of said beams being greater in cross section than the said filament portions, each beam coacting with said associated supported filament portion to produce a light diffraction pattern;
   at least two optical sensing means, each positioned to intercept the diffraction pattern of the light passing said filament portions at discrete spaced positions distinct from the optical paths of said light beams; and
   means coupled to said optical sensing means for comparing the outputs thereof and emitting a signal representative of said comparison.

2. The measurement device claimed in claim 1, further comprising a standard filament forming one of said filament portions, and a segment of a filament under test comprising another of said filament portions.

3. The measurement device claimed in claim 1, further comprising a segment of a filament under test, wherein said portions are different angular profiles at the same longitudinal position of the filament segment of said filament under test.

4. The measurement device claimed in claim 1, wherein said light emitting means for emitting a collimated light beam includes a mask having a circular aperture therein approximately twice the diameter of the filament being measured.

5. A measurement device for the profile of a moving filament comprising:
   means for emitting a collimated light beam of a wavelength short compared to the diameter of the filament to be measured, said light beam being directed substantially perpendicular to the axis of said filament and being greater in diameter than said filament diameter;
   means for supporting said filament;
   at least two spaced, discrete optical sensing means, each positioned distinct from the optical path of said light beam to intercept specific energy points on specific nodes of the diffraction pattern of the light passing the filament; and
   detector means coupled to said sensing means to effectively provide no output when the profile of the moving filament is of predetermined size.

* * * * *